Patented Mar. 6, 1945

2,371,113

UNITED STATES PATENT OFFICE 2,371,113

METHOD OF PREPARING MONOTHIOBIURET

Russell L. Sperry, Stamford, Conn., assignor to American Cyanamid Company, New York, N. Y., a corporation of Maine No Drawing. Application February 29, 1944, Serial No. 524,461

5 Claims. (Cl. 260—553)

The present invention is concerned with the production of monothiobiuret, a chemical compound which is particularly useful as an intermediate in preparing thermoplastic and water-repellent resins.

I have discovered that monothiobiuret may be readily prepared by heating a member of the group consisting of guanyl urea and guanyl urea carbonate with hydrogen sulfide under pressure in the presence of an inert solvent or diluent.

The reaction involving guanyl urea and hydrogen sulfide may be illustrated by the following equation:

Inert solvents or diluents which may be used in the process include, for example, water, dioxane, pyridine, methanol, ethanol, and other low molecular weight monohydric alcohols. Such liquids, in addition to being diluents, serve at least in part as solvents for the reactants, namely the guanyl urea, guanyl urea carbonate and hydrogen sulfide. Ketones and aldehydes, in general, enter into the reaction and are therefore unsuitable.

In carrying out the process, a pressure vessel provided with suitable means of agitation is charged with a slurry of guanyl urea or guanyl urea carbonate and the solvent or diluent, and heated to a temperature within the range of 60°–115° C. Hydrogen sulfide is then passed into the vessel and a pressure of from 100 to 250 pounds per square inch maintained throughout the run. A period of several hours is required to complete the reaction.

When using the lower temperatures and pressures in the above specified ranges, a longer time period will be required. Although temperatures and pressures somewhat below and above these ranges may be employed, the yield of monothiobiuret may be lower under such conditions.

After the reaction is complete, the solvent or diluent is removed, for example by evaporation or distillation to recover the same, and the residue recrystallized from water. The monothiobiuret thus obtained is a white needle-like crystalline material, melting at 187°–189° C., readily soluble in acetone, quite soluble in alcohols, somewhat soluble in dioxane, pyridine and water.

The invention is further illustrated by the following examples:

Example I

A slurry of guanyl urea carbonate was prepared by stirring a mixture of 157 grams of guanyl urea sulfate and 53 grams of sodium carbonate in 600 cc. of water. The slurry was saturated with hydrogen sulfide at room temperature in a rocker autoclave. The temperature was then raised to 100° C. and the pressure of hydrogen sulfide maintained between 200 and 250 pounds per square inch for six hours. The insolubles were filtered, washed with methanol, and the water-methanol filtrate evaporated to dryness. The resulting residue was slurried in 100 cc. of water and then neutralized with hydrochloric acid to dissolve any unreacted guanyl urea. The insoluble product was filtered off and recrystallized from water to yield long needle-shaped crystals melting at 187–189° C.

|  | Per cent N | Per cent S |
|---|---|---|
| Analysis of crystals | 35.16 | 26.86 |
| Theory for $C_2H_5ON_3S$ | 35.3 | 26.9 |

Example II

A charge of 200 grams of guanyl urea and 1000 cc. of ethanol was placed in an autoclave. The temperature was raised to about 75° C. and hydrogen sulfide passed in so as to maintain a pressure of 225 pounds per square inch. After twelve hours under these conditions, the charge was removed and the ethanol allowed to evaporate. The residue was recrystallized from hot water to yield crystals of monothiobiuret melting at about 187° C.

Example III

A mixture of 150 grams of guanyl urea and 600 cc. of dioxane was heated in a rocker autoclave at 100° C. for six hours under a pressure of 200–225 pounds per square inch of hydrogen sulfide. The charge was removed, the dioxane distilled off, and the remaining residue recrystallized from water. A white needle-like crystalline product was obtained having a melting point of 187–189° C.

Monothiobiuret is useful as a plasticizer, as an accelerator in the manufacture of rubber goods, and as an intermediate in the production of thermoplastic and water-repellent resins. It may also be used as an insecticide, and may be applied for such purpose in solution or suspension in water or in other liquid medium.

While the invention has been described with particular reference to specific embodiments, it is to be understood that it is not to be limited thereto, but is to be construed broadly and restricted solely by the scope of the appended claims.

I claim:

1. A method of preparing monothiobiuret which comprises heating together a member of the group consisting of guanyl urea and guanyl urea carbonate, and hydrogen sulfide under pressure in the presence of an inert solvent.

2. The method of claim 1 in which the reactants are heated at a temperature within the range of 60° to 115° C.

3. The method of claim 1 in which the pressure is maintained within the range of 100 to 250 pounds per square inch.

4. In a method of preparing monothiobiuret, the steps which consist in reacting a member of the group consisting of guanyl urea and guanyl urea carbonate with hydrogen sulfide at a pressure within the range of 100 to 250 pounds per square inch in the presence of an inert solvent and at a temperature between about 60° and 115° C. to form monothiobiuret, and separating the latter.

5. In a method of preparing monothiobiuret, the steps which consist in reacting a member of the group consisting of guanyl urea and guanyl urea carbonate with hydrogen sulfide at a pressure within the range of 100 to 250 pounds per square inch in the presence of an inert solvent and at a temperature between about 60° and 115° C. to form monothiobiuret, separating the latter and recrystallizing the same from water.

RUSSELL L. SPERRY.